No. 894,844. PATENTED AUG. 4, 1908.
K. B. MILLER.
GROUND WIRE CLAMP.
APPLICATION FILED JULY 6, 1907.

Witnesses:

Kempster B. Miller,
Inventor.
Attorneys

UNITED STATES PATENT OFFICE.

KEMPSTER B. MILLER, OF CHICAGO, ILLINOIS, ASSIGNOR TO STEEL GAIN MANUFACTURING COMPANY, OF CHICAGO, ILLINOIS, A CORPORATION OF ILLINOIS.

GROUND-WIRE CLAMP.

No. 894,844.      Specification of Letters Patent.      Patented Aug. 4, 1908.

Application filed July 6, 1907. Serial No. 382,457.

*To all whom it may concern:*

Be it known that I, KEMPSTER B. MILLER, a citizen of the United States of America, and a resident of Chicago, county of Cook, and State of Illinois, have invented a new and useful Improvement in Ground-Wire Clamps, of which the following is a specification.

My invention pertains to ground wire clamps, or in general to the making of electrical connections with conductors where soldering is impossible and the only practical form of electrical connection is some mechanical gripping device.

My object is to provide an improved device of such simple design as to be of low cost, at the same time easy and quick of application, and furnishing a secure, durable and reliable connection.

Figure 1:
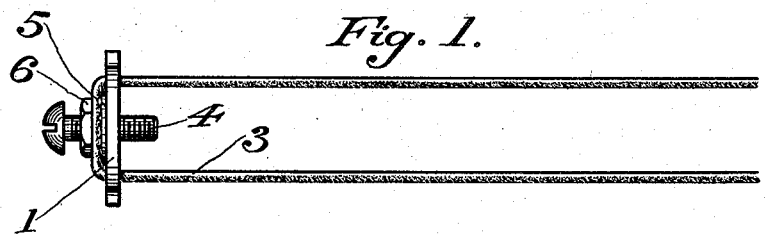
Figure 2:
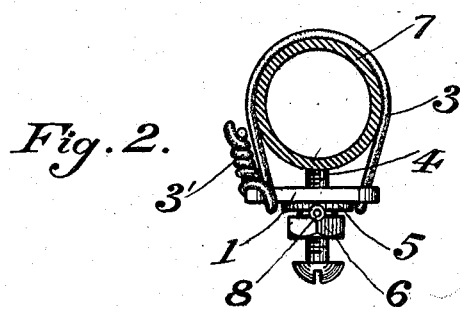
Figure 3:
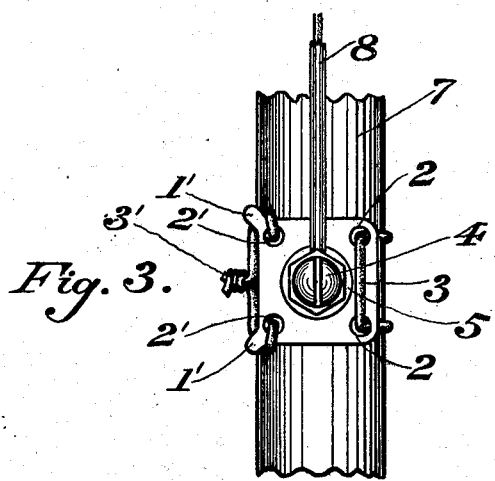

In the drawings Figure 1 shows my device before application; Fig. 2 shows the device as applied to a metal pipe, the pipe being shown in section; Fig. 3 shows elevation of the device as applied in Fig. 2.

In the figures, in which like reference numbers refer to like parts throughout, 1 is a plate substantially square having ears 1' 1' at two adjacent corners. It is drilled with four holes at 2—2—2'—2' near the corners, and is drilled and threaded centrally. The U-shaped wire 3 is passed through holes 2—2 and machine screw 4 is screwed into the threaded central hole. The machine screw 4 is provided with washer 5 and nut 6. The doubled wire 3 thus forms a flexible band for passing around the water pipe 7.

The device of Fig. 1 as thus described is ready for installation. The screw 4 is first withdrawn so that its end is approximately flush with plate 1. The free ends of the wire 3 are passed around the water pipe 7 or other object to which the ground wire is to be attached, and are passed through the holes 2' 2' respectively; they then are passed behind the adjacent projecting ears 1' 1', the two ends then being twisted together as at 3' in Fig. 3. By thus passing the wire ends through an irregular path around the projections 1' 1' before twisting them together, the resistance of the wires against a tendency to pull back through the holes 2' 2' is increased, and the tendency to rupture the twist at 3' is overcome. The device is tightened upon the pipe by turning the screw 4 which takes seat upon the pipe and tightens the wire 3 by increasing the distance between the screw plate 1 and pipe 7. Conductor 8 may be clamped under nut 6 on either side of washer 5, the locking of the nut 6 upon the conductor 8 serving also to lock the screw 4 in the plate 1.

Having thus described my invention, what I claim as new and desire to secure by United States Letters Patent is:

1. In a ground wire clamp, a screw plate, a screw therefor and a U-shaped wire engaging at its central portion one side of said plate and adapted to engage the alternative side of said plate by its end portions, substantially as described.

2. In a ground wire clamp, a screw plate having four holes therein, and a U-shaped wire passing through two of said holes, substantially as described.

3. In a ground wire clamp, a screw plate having holes therein, and a flexible pipe-clamping wire passing through holes at one side of said screw plate and adapted to pass its ends through holes on the opposite side of said screw plate, and projections on said screw plate adjacent to the holes for receiving the ends of said wire and adapted to assist in retaining the ends of said wire, substantially as described.

Signed by me at Chicago, county of Cook and State of Illinois, in the presence of two witnesses.

KEMPSTER B. MILLER.

Witnesses:
     DAVID S. HULFISH,
     HARRIET L. SMITH.